(12) United States Patent
Moore

(10) Patent No.: US 7,833,332 B2
(45) Date of Patent: Nov. 16, 2010

(54) COATING SOLUTION FOR METAL SURFACES

(75) Inventor: Richard Moore, Cincinnati, OH (US)

(73) Assignee: Dubois Chemicals, Inc., Sharonville, OH (US)

( * ) Notice: Subject to any disclaimer, the term of this patent is extended or adjusted under 35 U.S.C. 154(b) by 55 days.

(21) Appl. No.: 12/263,641

(22) Filed: Nov. 3, 2008

(65) Prior Publication Data

US 2009/0114118 A1 May 7, 2009

Related U.S. Application Data

(60) Provisional application No. 60/984,955, filed on Nov. 2, 2007.

(51) Int. Cl.
*C23F 11/00* (2006.01)
*C23C 22/05* (2006.01)

(52) U.S. Cl. .............. 106/14.43; 106/14.11; 106/14.15; 106/14.41; 106/14.42; 148/243; 148/247; 427/387; 428/457

(58) Field of Classification Search .............. 106/14.11, 106/14.15, 14.41, 14.42, 14.43; 427/387; 428/457
See application file for complete search history.

(56) References Cited

U.S. PATENT DOCUMENTS

| | | | | |
|---|---|---|---|---|
| 5,750,197 | A * | 5/1998 | van Ooij et al. | 427/308 |
| 6,270,884 | B1 * | 8/2001 | Guhde et al. | 428/323 |
| 6,299,721 | B1 * | 10/2001 | Poutasse et al. | 156/278 |
| 6,409,874 | B1 * | 6/2002 | Van Der Aar et al. | 156/314 |
| 6,506,314 | B1 * | 1/2003 | Whitney et al. | 216/100 |
| 6,534,187 | B2 * | 3/2003 | Kron et al. | 428/447 |
| 6,733,892 | B1 * | 5/2004 | Yoneda et al. | 428/447 |
| 7,018,463 | B2 * | 3/2006 | Terry | 106/287.13 |
| 2007/0298174 | A1 * | 12/2007 | Kolberg et al. | 427/352 |
| 2008/0230394 | A1 * | 9/2008 | Inbe et al. | 205/241 |
| 2008/0230395 | A1 * | 9/2008 | Inbe et al. | 205/261 |

FOREIGN PATENT DOCUMENTS

WO    WO0107679 A1 *  2/2001

* cited by examiner

*Primary Examiner*—Anthony J Green
(74) *Attorney, Agent, or Firm*—Jones Day

(57) ABSTRACT

An aqueous metal treatment composition designed to improve adhesion and corrosion resistance of the metal surface includes an organofunctional silane in combination with a fluorozirconic or fluorotitanic acid, methanesulfonic acid and nitric acid. The methanesulfonic acid acts to reduce sludge formation. Preferably, the composition also includes a fluorosilicic acid which likewise reduces sludge and improves corrosion resistance.

18 Claims, No Drawings

COATING SOLUTION FOR METAL SURFACES

This application claims priority to U.S. Provisional Patent Application No. 60/984,955, filed Nov. 2, 2007, entitled COATING SOLUTION FOR METAL SURFACES, which is incorporated herein by reference in its entirety.

BACKGROUND

Metal surfaces require pretreatment before being coated with polymeric coatings such as paints, and the like. Without such pretreatment, adhesion of the coating is generally poor. Further, untreated metal surfaces, even when coated with a polymeric coating, may suffer severe corrosion.

Many different pretreatments have been utilized to provide corrosion prevention and improved adhesion. Chromium and phosphate pretreatments have been used, but are in disfavor. Silane treatment, as well as treatment with zirconium has also been suggested. In particular, a treatment combining an organofunctional silane with a zirconium compound and various acids has been used to provide corrosion prevention and to improve adhesion.

Such a coating composition is very acidic. Therefore, there is a tendency to form a sludge. Although this does not interfere with the quality of the treatment, it does create a waste disposal problem.

SUMMARY

The present example is premised on the realization that a silane zirconium metal pretreatment which incorporates methanesulfonic acid produces significantly less sludge than one without methanesulfonic acid. Further, the methanesulfonic acid enhances corrosion protection. More particularly, the present example incorporates an organofunctional silane, a fluorozirconic or fluorotitanic acid, and nitric acid to pretreat metal. This composition provides a zirconium or titanium coating onto the metal surface, which, together with the silane, prevents corrosion and enhances adhesion of subsequent polymeric coatings.

DETAILED DESCRIPTION

The coating composition of the present example is an aqueous-based coating composition that includes an organofunctional silane, a fluorotitanic or fluorozirconic acid, methanesulfonic acid, nitric acid, and, optionally, a fluorosilicic acid. This is formulated as a concentrated solution which is used at a rate of 1-10% by weight in water.

In the concentrated treatment solution, the organofunctional silane should be present in an amount of about 0.5 to about 3% by weight (all percentages are by weight unless expressly stated otherwise). The organofunctional silane may generally include silicon having bonded thereto one or more alkoxy groups and preferably one additional organofunctional compound such as an amino, ureido, epoxy, vinyl, cyanato, or mercapto group. One type of organofunctional silane that may be utilized is an aminoalkoxy silane. Another type of organofunctional silane that may be utilized is an alkoxy silane. Organofunctional silanes which treat metal surfaces are disclosed, for example, in U.S. Pat. Nos. 6,409,874, 5,750,197; 6,534,187; and 6,270,884, the disclosures of which are hereby incorporated by reference.

Suitable amino substituted organofunctional silanes include gamma aminopropyltriethoxysilane, aminopropyltrimethoxysilane, aminoethylaminopropyltrimethoxysilane, aminoethylaminopropyltriethoxysilane, as well as bis-aminosilanes. A suitable mercapto silane is gamma mercaptopropyltrimethoxysilane. Other silanes include gamma ureidopropyltrialkoxysilane, vinyltrimethoxysilane, vinyltriethoxysilane, vinyltriacetoxysilane, methacryloxypropyltrimethoxysilane, gamma glycidoxypropyltrimethoxysilane, as well as others.

The silane is generally selected for the end use application. If an epoxy coating is intended to be ultimately applied to the metal surface, an epoxyalkoxysilane is preferred.

In addition to the organofunctional silane, the present example will include a source of zirconium or titanium, or a mixture thereof. The preferred sources of zirconium or titanium are fluorotitanic acid and fluorozirconic acid, with fluorozirconic acid being preferred. Generally, the fluorozirconic acid will be present in the concentrated formula in an amount from about 0.5 to about 2% by weight actives, preferably about 0.75 to about 1.5%, and most preferably about 1%.

In addition to the source of zirconium or titanium, the coating composition of the present example will include methanesulfonic acid. The methanesulfonic acid should be present in the concentrated solution in an amount of at least about 0.5% on an actives basis by weight up to about 1%. Methanesulfonic acid concentrations above about 1% will not interfere with the present example but do not contribute further to the coating composition. Preferably, the methanesulfonic acid is present in an amount about equal to 0.75% by weight in the concentrated coating solution.

The concentrated coating composition of the present example also includes an acidic nitrogen compound which acts as an accelerant such as nitric acid or urea. The accelerant should be present in an amount equal to about 0.05% up to about 0.5% on an actives basis. Increasing the amount of accelerant above about 0.5% will make the coating too aggressive, causing increased sludge formation.

In addition to the above components, the concentrated coating composition can also include a fluorosilicic acid. The fluorosilicic acid also helps reduce sludge. This should be present in an amount from about 0 to about 0.7% with about 0.2 to about 0.5% preferred, preferably about 0.3%. If excess fluorosilicic acid is employed, again, the coating becomes too aggressive.

The concentrated composition of the present example is formulated by dissolving the silane in water and subsequently adding the other components with mixing. This is then diluted further with water and applied to a metal surface. The treatment composition at use concentration should include the following:

| Water | balance |
| --- | --- |
| Organofunctional silane | 0.005-0.3% |
| Fluorozirconic acid or fluorotitanic acid | 0.005-0.2% |
| Methanesulfonic acid | 0.005-0.1% |
| Fluorosilicic acid | 0-0.07% |
| Nitric acid | 0.0006-0.05% |

All components are listed at 100% actives.

The pH of the coating when applied should be 2.5 to about 6.

A preferred formulation is shown below:

|  | Concentrated Solution | Use Concentration |
|---|---|---|
| Water | 94.5% | Balance |
| Silquest A-1100 (gamma aminopropylethoxysilane) | 1% | 0.1-0.01% |
| Fluorozirconic acid (46% actives) | 2% | 0.2-0.02% |
| Fluorosilicic acid (23% actives) | 0.5% | 0.05-0.005% |
| Methanesulfonic acid (75% actives) | 1% | 0.1-0.01% |
| Nitric acid (28% actives) | 1% | 0.1-0.01% |

This formula can be used to treat most common metals including steel, stainless steel, galvanized steel and galvaneal, aluminum, as well as others. To treat a metal surface with the coating composition, 1 to 10% of the concentrated treatment composition is dissolved in water. The pH is adjusted into the range of 3.5-6.0 by adding any common source of alkalinity such as sodium hydroxide.

The coating is applied to a metal surface at ambient temperature, about 70° F., up to about 150° F. It can be applied by using an open spray system, cabinet spray washer, belt washer, tumbling washer, wand systems, garden sprayers, pressure washer, or by simply immersing the metal part in a tank containing the coating composition, or by steaming a part with the solution. The contact time should be 5 seconds to 10 minutes. The metal surface is rinsed with water or a chemical sealer, allowed to dry, and then can subsequently be treated with additional coatings and the like, such as paints and other polymeric coatings.

Other components may be optionally added to the present coating solution. For example, a cleaning agent such as a surfactant or polymer may be added to the solution to provide cleaning in the same step as the pretreatment. Also, an anti-rust agent such as sodium molybdate, ammonium molybdate, or an amine can be added to the solution to reduce flash rust.

The present coating solution will be further appreciated in light of the following detailed examples.

DETAILED EXAMPLE 1

The following sample was prepared,

| Deionized Water | 96% |
|---|---|
| Silquest A-1100 | 1% |
| Fluorozirconic Acid (46% Active) | 2% |
| Nitric Acid (42 Baume) | 1% |

1000 mL of a 3% solution of the above formula was made and adjusted with sodium hydroxide to a pH of 4.5. Into this solution was placed a 2"×3" cold rolled steel panel. At several intervals, the panels were replaced with fresh panels and the solution and sludge generated were notated. After 312 hours, the test was ended.

DETAILED EXAMPLE 2

The following sample was prepared,

| Deionized Water | 94.5% |
|---|---|
| Silquest A-1100 | 1% |
| Fluorozirconic Acid (46% Active) | 2% |
| Fluorosilicic Acid (23% Active) | 0.5% |
| Methane Sulfonic Acid (75% Active) | 1% |
| Nitric Acid 42 Baume | 1% |

1000 mL of a 3% solution of the above formula was made and adjusted with sodium hydroxide to a pH of 4.5. Into this solution was placed a 2"×3" cold rolled steel panel. At several intervals, the panels were replaced with fresh panels and the solution and sludge generated were notated. After 312 hours, the test was ended.

Results:

|  | Detailed Example 1 | | Detailed Example 2 | |
|---|---|---|---|---|
| Hours | Sludge (inches) | Solution Appearance | Sludge (inches) | Solution Appearance |
| 72 | 1/16-1/8 | Light Orange | 0 | Clear |
| 144 | 1/4 | Dark Orange | 1/16-1/8 | Light Orange |
| 312 | 1/4 | Deep Orange/Red | 1/8 | Light Orange |

DETAILED EXAMPLE 3

1000 mL of a 3% solution of the formula described in DETAILED EXAMPLE 1 was made and adjusted with sodium hydroxide to a pH of 4.5. Into this solution was placed a 2"×3" cold rolled steel panel. At several intervals, the panels were replaced with fresh panels. The used panels were rinsed with water for approximately 30 seconds and the condition of the rinsed panels was notated. After 312 hours, the test was ended.

DETAILED EXAMPLE 4

1000 mL of a 3% solution of the formula described in DETAILED EXAMPLE 2 was made and adjusted with sodium hydroxide to a pH of 4.5. Into this solution was placed a 2"×3" cold rolled steel panel. At several intervals, the panels were replaced with fresh panels. The used panels were rinsed with water for approximately 30 seconds and the condition of the rinsed panels was notated. After 312 hours, the test was ended.

Results:

|  | Panel Appearance | |
|---|---|---|
| Hours | Detailed Example 3 | Detailed Example 4 |
| 72 | 95% rust covered 5% with blue coating | 5% rust covered 95% blue coating |
| 218 | 100% rust covered | 5% rust covered 95% blue/gray coating |
| 312 | 100% rust covered | 25% rust covered 95% blue/gray coating |

DETAILED EXAMPLE 5

The following sample was prepared,

| | |
|---|---|
| Deionized Water | 94.5% |
| Silquest A-1100 | 1% |
| Fluorozirconic Acid (42% Actives) | 2% |
| Fluorosilicic Acid (23% Actives) | 0.5% |
| Urea | 1% |
| Methane Sulfonic Acid (75% Actives) | 1% |

Cold rolled steel test panels were treated with the following multi-stage spray system:
a) The panels were degreased using a 3% dilution of the DuBois Chemicals' product Kool Terj for 60 seconds at 90° F.
b) The panels were rinsed with water for 30 seconds.
c) The panels were treated with a 2% dilution of the above formula at a pH of 4.5. The pH of the solution was adjusted to 4.5 with sodium hydroxide. The panels were treated for 45 seconds at 10 psi pressure and ambient temperature.
d) The panels were rinsed with water for 30 seconds.

The panels were then coated with a polyester based powder coating supplied by Rohm and Haas. Three of the panels were tested for adhesion according to ASTM D3359. The remaining panels were placed in salt spray testing according to ASTM B117. After 600 hours of testing, the panels were rated according to ASTM D 1654.

DETAILED EXAMPLE 6

The following sample was prepared,

| | |
|---|---|
| Deionized Water | 95.5% |
| Silquest A-1100 | 1% |
| Fluorozirconic Acid (46% Actives) | 2% |
| Fluorosilicic Acid (23% Actives) | 0.5% |
| Urea | 1% |

Cold rolled steel test panels were treated with the following multi-stage spray system:
a) The panels were degreased using a 3% dilution of the DuBois Chemicals' product Kool Terj for 60 seconds at 90° F.
b) The panels were rinsed with water for 30 seconds.
c) The panels were treated with a 2% dilution of the above formula at a pH of 4.5. The pH of the solution was adjusted to 4.5 with sodium hydroxide. The panels were treated for 45 seconds at 10 psi pressure and ambient temperature.
d) The panels were rinsed with water for 30 seconds.

The panels were then coated with a polyester based powder coating supplied by Rohm and Haas. Three of the panels were tested for adhesion according to ASTM D3359. The remaining panels were placed in salt spray testing according to ASTM B117. After 600 hours of testing, the panels were rated according to ASTM D 1654.

DETAILED EXAMPLE 7

The following sample was prepared,

| | |
|---|---|
| Deionized Water | 95.5% |
| Silquest A-1100 | 1% |
| Fluorozirconic Acid (46% Actives) | 2% |
| Fluorosilicic Acid (23% Actives) | 0.5% |
| Methane Sulfonic Acid (75% Actives) | 1% |

Cold rolled steel test panels were treated with the following multi-stage spray system:
a) The panels were degreased using a 3% dilution of the DuBois Chemicals' product Kool Terj for 60 seconds at 90° F.
b) The panels were rinsed with water for 30 seconds.
c) The panels were treated with a 2% dilution of the above formula at a pH of 4.5. The pH of the solution was adjusted to 4.5 with sodium hydroxide. The panels were treated for 45 seconds at 10 psi pressure and ambient temperature.
d) The panels were rinsed with water for 30 seconds.

The panels were then coated with a polyester based powder coating supplied by Rohm and Haas. Three of the panels were tested for adhesion according to ASTM D3359. The remaining panels were placed in salt spray testing according to ASTM B117. After 600 hours of testing, the panels were rated according to ASTM D 1654.

DETAILED EXAMPLE 8

Cold rolled steel test panels were treated with the following multi-stage spray system:
a) The panels were degreased using a 3% dilution of the DuBois Chemicals' product Kool Terj for 60 seconds at 90° F.
b) The panels were rinsed with water for 30 seconds.
c) The panels were treated with a standard iron phosphate solution (a 2% dilution of the DuBois product Secure Tec ES at a pH of 5.5. The pH of the solution was adjusted to 5.5 with sodium hydroxide. The panels were treated for 45 seconds at 10 psi pressure and ambient temperature.
d) The panels were rinsed with water for 30 seconds.
e) The panels were treated with a final seal for 30 seconds, a pressure of 10 psi, and at ambient temperature. The final seal solution was a combination of two DuBois products: spectraLINK at 1% and Duraseal at 0.5%, adjusted with sodium hydroxide to a pH of 4.5. The panels were then coated with a polyester based powder coating supplied by Rohm and Haas. Three of the panels were tested for adhesion according to ASTM D3359. The remaining panels were placed in salt spray testing according to ASTM B117. After 600 hours of testing, the panels were rated according to ASTM D 1654.

Results:

| | Paint Adhesion Results (ASTM D3359) | | | |
|---|---|---|---|---|
| Panel Number | Detailed Example 5 | Detailed Example 6 | Detailed Example 7 | Detailed Example 8 |
| 1 | 5B | 5B | 5B | 5B |
| 2 | 5B | 5B | 5B | 4B |
| 3 | 5B | 4B | 4B | 5B |

| | Average Salt Spray Rating (D1654) at 600 hours |
|---|---|
| Detailed Example 5 | 5.33 |
| Detailed Example 6 | 4.67 |
| Detailed Example 7 | 5.67 |
| Detailed Example 8 | 4 |

DETAILED EXAMPLE 9

Cold rolled steel test panels were treated with the following multi-stage spray system:
a) The panels were degreased using a 3% dilution of the DuBois Chemicals' product Kool Terj for 60 seconds at 90° F.
b) The panels were rinsed with water for 30 seconds.
c) The panels were treated with a 2% dilution of the present example (DETAILED EXAMPLE 2) at a pH of 4.5. The pH of the solution was adjusted to 4.5 with sodium hydroxide. The panels were treated for 45 seconds at 10 psi pressure and ambient temperature.
d) The panels were rinsed with water for 30 seconds.

The panels were then coated with a polyester based powder coating supplied by Rohm and Haas. The panels were placed in salt spray testing according to ASTM B 117. After 200, 400, and 600 hours of testing, the panels were rated according to ASTM D 1654.

DETAILED EXAMPLE 10

ACT test panels (B1000 with DI rinse) were coated with a polyester based powder coating supplied by Rohm and Haas. The panels were placed in salt spray testing according to ASTM B117. After 200, 400, and 600 hours of testing, the panels were rated according to ASTM D 1654.

Results:

| | Average Salt Spray Rating (D1654) | |
|---|---|---|
| Hours | Detailed Example 9 | Detailed Example 10 |
| 200 | 9.33 | 3.67 |
| 400 | 7.33 | 2.67 |
| 600 | 7.67 | 2 |

DETAILED EXAMPLE 11

Aluminum, electrogalvanized, and hot dipped galvanized test panels were run through the following spray system:
a) The panels were degreased using a 3% dilution of the DuBois Chemicals' product Met-ALL Terj for 60 seconds at 90° F.
b) The panels were rinsed with water for 30 seconds.
c) The panels were further rinsed with water for 45 seconds.
d) The panels were treated with a 2.3% dilution of the present example (DETAILED EXAMPLE 2). The pH of the solution was adjusted to 4.76 with ammonium carbonate. The panels were treated for 30 seconds at 12 psi pressure and ambient temperature.
e) The panels were rinsed with water for 30 seconds.

The panels were then coated with an epoxy based powder coating supplied by Sherwin Williams. The panels were placed in salt spray testing according to ASTM B 117. The panels were run until their ASTM D1654 rating fell below 7.

Results:

| Substrate | Average Number of Hours Prior to Failure (Rating below 7 according to D1654) |
|---|---|
| Aluminum | Panels passed 3000 hours without failure |
| Hot Dipped Galvanized | 264 |
| Electrogalvanized | 264 |

DETAILED EXAMPLE 12

Cold rolled steel test panels were run through the following spray system:
a) The panels were degreased using a 3% dilution of the DuBois Chemicals' product Met-ALL Terj for 60 seconds at 90° F.
b) The panels were rinsed with water for 30 seconds.
c) The panels were further rinsed with water for 45 seconds.
d) The panels were treated with a 2.3% dilution of the present example (DETAILED EXAMPLE 2) at a pH of 4.9. The pH of the solution was adjusted to 4.76 with ammonium carbonate. The panels were treated for 30 seconds at 12 psi pressure and ambient temperature.
e) The panels were rinsed with water for 30 seconds.

The panels were then coated with an epoxy based powder coating supplied by Sherwin Williams. The panels were placed in salt spray testing according to ASTM B117. The panels were run until their ASTM D1654 rating fell below 7.

DETAILED EXAMPLE 13

ACT test panels (B1000 with DI Rinse) were coated with an epoxy based powder coating supplied by Sherwin Williams. The panels were placed in salt spray testing according to ASTM B117. The panels were run until their ASTM D1654 rating fell below 7.

Results:

| | Average Number of Hours Prior to Failure (Rating below 7 according to D1654) |
|---|---|
| Example 12 | 876 |
| Example 13 | 696 |

As shown in the above detailed examples and general description, the present coating solution provides several advantages. The sludge produced utilizing the present coating solution is significantly less than the sludge that would be produced if the methanesulfonic acid were not incorporated into the coating composition. Sludge is an undesirable byproduct which is significantly reduced by practicing the present coating solution.

Further, typical products which use zirconium to pretreat metal surfaces prior to painting are very vulnerable to rusting. The above examples have shown that the use of methanesulfonic acid as well as fluorosilicic acid reduces rust formation on coated steel panels. Finally, the present coating solution, when applied to galvanized steel, exhibited crystal growth on the surface of the galvanized part subsequent to treatment. Crystal growth is not seen on galvanized steel when using an iron phosphate process, but is seen when zinc phosphate is used. Thus, the present example can be used to replace zinc phosphate coatings typically used on galvanized steel.

The claimed invention is not to be limited to only the specific embodiments depicted herein. Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. An aqueous metal treatment composition comprising an organofunctional silane in combination with a source of at least one of fluorozirconic acid and fluorotitanic acid, or combinations thereof, methane sulfonic acid in an amount of 0.005% to 0.1%, and an acidic nitrogen compound in an amount of 0.0006% to 0.05%.

2. The composition claimed in claim 1 further comprising fluorosilicic acid.

3. The composition claimed in claim 1 wherein said acidic nitrogen compound is selected from the group consisting of nitric acid, urea, and combinations thereof.

4. The composition claimed in claim 1 wherein said organofunctional silane is an aminoalkoxy silane.

5. The composition claimed in claim 1 wherein said organofunctional silane is an alkoxy silane.

6. The composition claimed in claim 1 further comprising a cleaning agent.

7. The composition claimed in claim 1 further comprising an anti-rust agent.

8. An aqueous metal treatment composition comprising an organofunctional silane in combination with a source of zirconium, methanesulfonic acid, and nitric acid, wherein the said composition comprises:

| | |
|---|---|
| Water, | |
| Organofunctional silane | 0.005-0.3% |
| Fluorozirconic acid | 0.005-0.2% |
| Methanesulfonic acid | 0.005-0.1%, and |
| Nitric acid | 0.0006-0.05% |

9. The composition claimed in claim 8 further comprising a cleaning agent.

10. The composition claimed in claim 8 further comprising an anti-rust agent.

11. The composition claimed in claim 8, further comprising a fluorosilicic acid in the range of 0.005-0.07%.

12. A method of treating a metal surface comprising contacting said metal surface with an aqueous based metal treatment composition comprising an organofunctional silane in combination with a source of at least one of fluorozirconic acid and fluorotitanic acid, or combinations there, methane sulfonic acid in an amount of 0.005% to 0.1%, and an acidic nitrogen compound in an amount of 0.0006% to 0.05%.

13. The method claimed in claim 12 wherein said composition further comprises fluorosilicic acid.

14. The method claimed in claim 12 wherein said composition further comprises a cleaning agent.

15. The method claimed in claim 12 wherein said composition further comprises an anti-rust agent.

16. A method of treating a metal surface comprising contacting said metal surface with an aqueous based metal treatment composition comprising an organofunctional silane in combination with a source of zirconium, methane sulfonic acid, and nitric acid, wherein said composition comprises

| | |
|---|---|
| Water, | |
| Organofunctional silane | 0.005-0.3% |
| Fluorozirconic acid | 0.005-0.2% |
| Methanesulfonic acid | 0.005-0.1%, and |
| Nitric acid | 0.0006-0.05% |

17. The method claimed in claim 16, wherein the composition of the method further comprises a fluorosilicic acid in the range of 0.005-0.07%.

18. A metal surface treated with an aqueous based metal treatment composition comprising an organofunctional silane in combination with a source of at least one of fluorotitanic acid and fluorozirconic acid, or combinations thereof, methane sulfonic acid in an amount of 0.005% to 0.1%, and an acidic nitrogen compound in an amount of 0.0006% to 0.05%.

* * * * *